United States Patent [19]
Sasaki

[11] 4,060,919
[45] Dec. 6, 1977

[54] DATA RETRIEVING DEVICE

[75] Inventor: Hiromichi Sasaki, Nagareyama, Japan

[73] Assignee: Kabushiki Kaisha Fuji Seisakusho, Japan

[21] Appl. No.: 706,611

[22] Filed: July 19, 1976

[30] Foreign Application Priority Data

July 28, 1975 Japan .......................... 50-104280[U]

[51] Int. Cl.² ............................................. G09F 11/10
[52] U.S. Cl. .................................. 40/104 A; 40/53 R
[58] Field of Search .................... 40/68, 104 A, 104 R, 40/97, 98, 35, 52 R, 53 R, 53 A, 33, 36; 340/147 R, 324

[56] References Cited

U.S. PATENT DOCUMENTS

| 2,215,381 | 9/1940 | Townsend | 40/53 R |
|---|---|---|---|
| 2,384,355 | 9/1945 | Torrence et al. | 40/53 R |
| 2,443,925 | 6/1948 | Osborne | 40/53 R |
| 2,883,250 | 4/1959 | Tod et al. | 40/104 R |
| 2,995,726 | 8/1961 | Rickard | 40/104 R |
| 3,501,761 | 3/1970 | Capellari | 40/35 |

*Primary Examiner*—Stephen C. Bentley
*Assistant Examiner*—Ralph Palo
*Attorney, Agent, or Firm*—Polster, Polster and Lucchesi

[57] ABSTRACT

A device for retrieving data such as individual names, firm names, addresses, telephone numbers, and so forth, which is constructed in a handy and compact type, and which comprises a rotatable data recording member having a plurality of data indicating parts, a plurality of data retrieving members corresponding to the data indicating parts of the rotatable data recording member, a drive mechanism to rotate the data recording member, and a control mechanism to cause the drive mechanism to stop by operating one of the data retrieving members, and to cause the data indicating parts of the data recording member to the data retrieving member to be presented for reading out.

3 Claims, 7 Drawing Figures

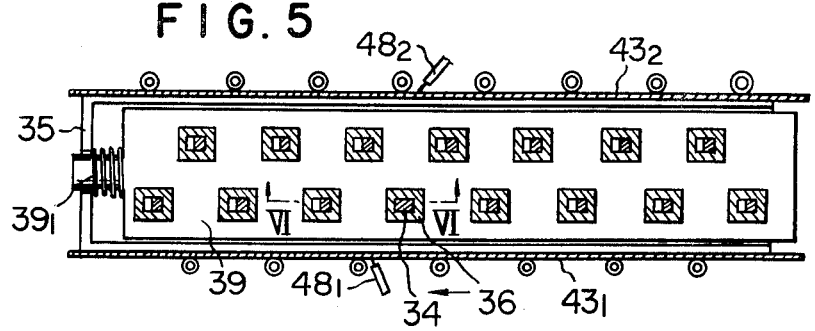
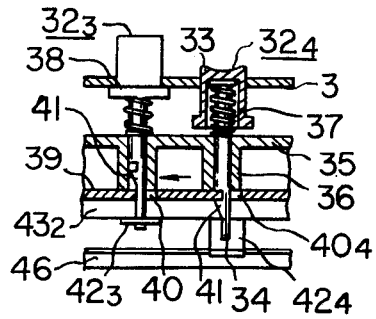
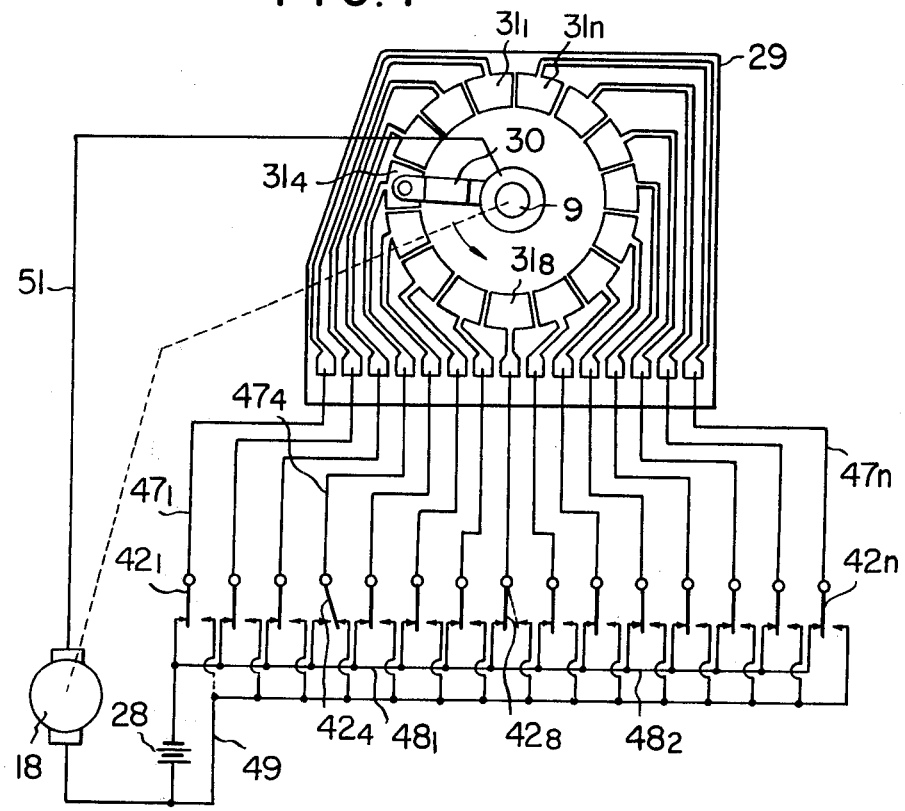

4,060,919

DATA RETRIEVING DEVICE

BACKGROUND OF THE INVENTION

This invention relates to a data retrieving device, and, more particularly, it is concerned with an electrically-operated device construction for finding out whatever desired informations one want to obtain.

For readily finding out, for example, names, addresses, telephone numbers, and so forth of individual persons, firms, and companies, it has so far been a usual practice to store these data in index cards, tables, and so forth in an alphabetical order, and manually pick up these index cards, etc. containing such informations, when it becomes necessary to obtain any specific informations from these recorded media. However, as the contents of the informations to be stored in such storing media increase, these cards and tables become inevitably voluminous with the consequent difficulty in manually finding out the relevant card and table out of the stack, wherein such required informations are recorded and maintained, which work is troublesome and time-consuming.

In order to solve such inconvenience, it is contemplated that such data be split into small group having close relevance each other, and stored in a plurality of cards, or the like which are then accommodated in an electro-mechanically operated device to select out the necessary and desired data by manipulation of push buttons corresponding to the classified and stored informations.

SUMMARY OF THE INVENTION

It is a primary object of the present invention to provide a device which enables accurate retrieval of desired data to be accomplished by simple manipulation of data selection button.

It is a secondary object of the present invention to provide a data retrieving device, in which all the operational mechanisms and the electrical circuit to control the operations are simplified to the maximum possible extent.

It is a third object of the present invention to provide a data retrieving device which is constructed in a compact size so as to be handy and convenient for use even at a small space such as a desk top, and others.

According to the present invention, generally speaking, there is provided a data retrieving device which comprises in combination, a rotatable data recording member having a plurality of data indicating parts, a plurality of data retrieving members corresponding to the data indicating parts of the rotatable data recording member, a drive mechanism to rotate the data recording members, and a control mechanism to cause the drive mechanism to stop by operating one of the data retrieving members, and to cause the data indicating parts of the data recording member corresponding to the data retrieving member to be presented for reading out.

The foregoing objects and other objects, as well as specific construction and operations of the data retrieving device according to the present invention will become more apparent from the following detailed description of the invention, when read in conjunction with the accompanying drawing.

BRIEF DESCRIPTION OF ACCOMPANYING DRAWING

In the drawing:

FIG. 5 is a cross-sectional view of a button switch contact structure of the device taken along a line V—V in FIG. 3;

FIG. 6 is a cross-sectional view showing further details of the switch contact of the device taken along a line VI—VI in FIG. 5; and FIG. 7 is an electrical circuit to drive the device.

DETAILED DESCRIPTION OF PREFERRED EMBODIMENT

Figure 1:
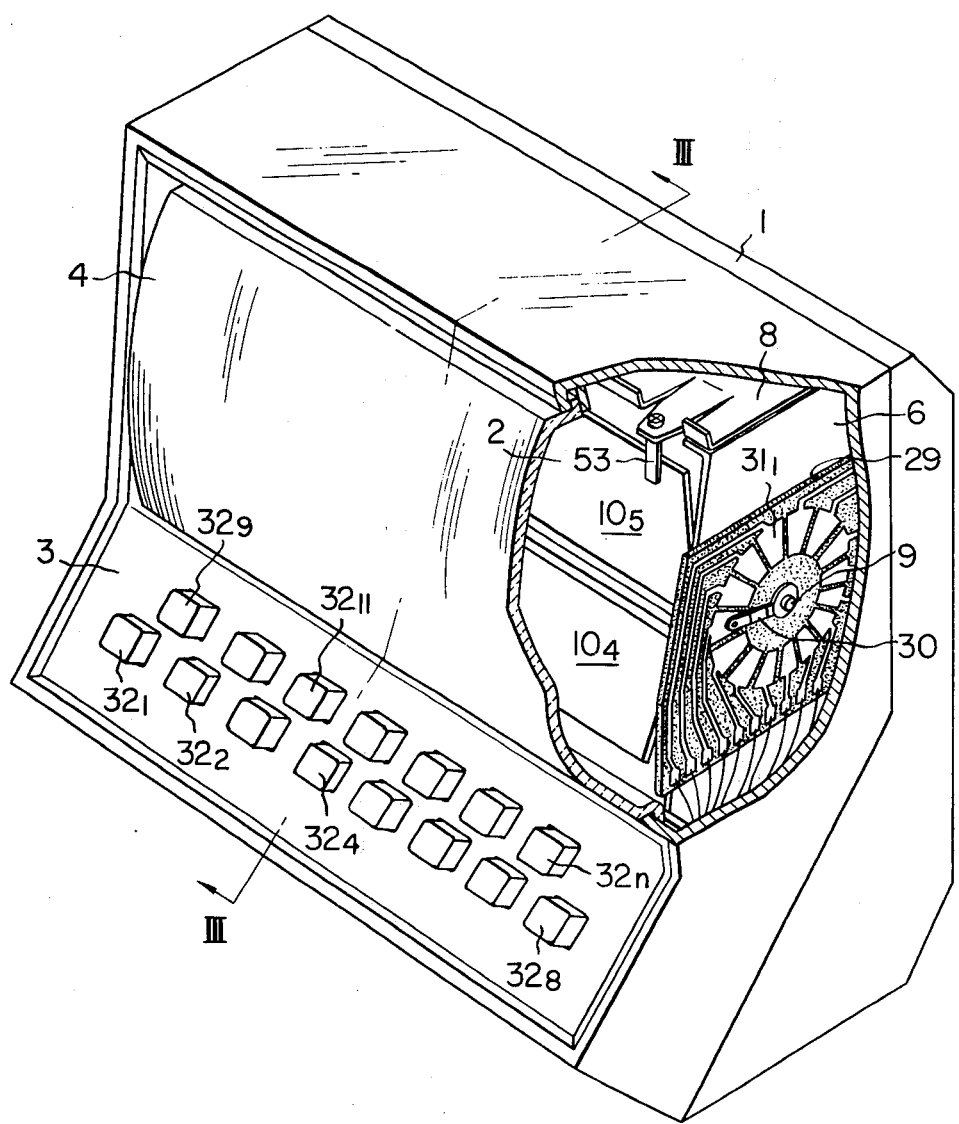
FIG. 1 is a perspective view of one embodiment of the data retrieving device according to the present invention, with one part thereof being removed to expose the inner part.
Figure 2:
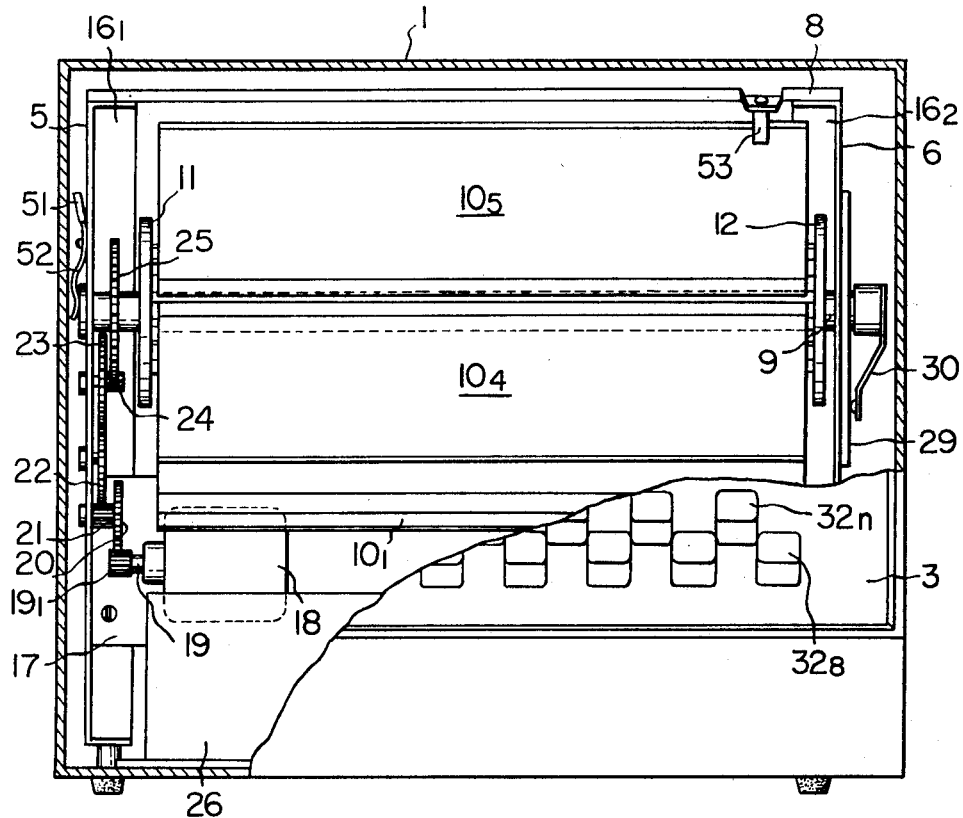
FIG. 2 is a front view of the data retrieving device shown in FIG. 1 with a major portion thereof being removed to show its inside structure.
Figure 3:
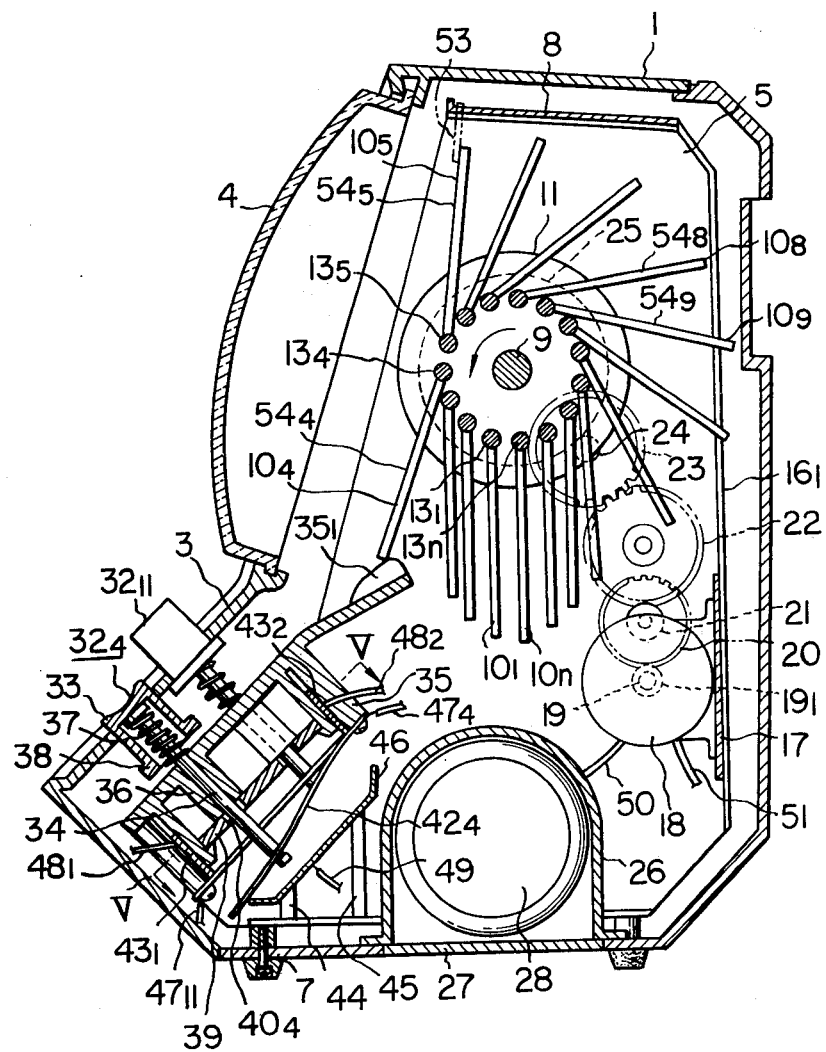
FIG. 3 is a cross-sectional view of the data retrieving device shown in FIG. 1 taken along a line III—III.

Referring now to FIGS. 1 to 3, the entire mechanism for the data retrieving device is accommodated in a housing 1 having a data read-out opening, or window, 2 on the upper front part thereof, and a data retrieving keyboard 3 on the lower front part thereof. The data read-out window 2 is covered with a transparent cover 4 made of transparent plastic material, glass, and so on. The cover is fitted on the window portion in a freely attachable and detachable manner.

On both left and right sides in the housing 1, there are fixed upright side plates 5 and 6 by means of threaded screws 7 screwed in from the bottom part of the housing. On the top edges of the two side plates 5 and 6, there is extended a ceiling plate 8, which is fixed at both ends thereof to the top edges of the upright side plates in an appropriate manner.

Figure 4:
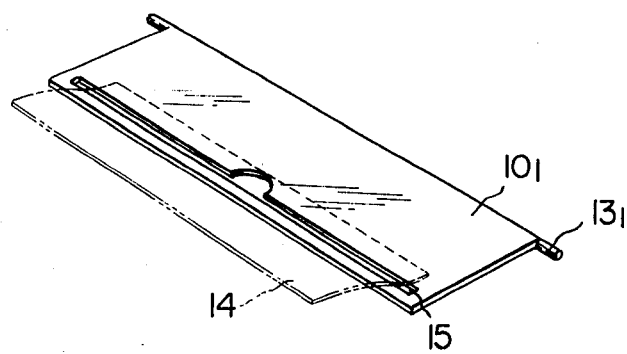
FIG. 4 is a perspective view of a data indicating panel for use in the data retrieving device in FIGS. 1 through 3.

At an appropriate position in the upper part of a space defined by the two side plates 5 and 6, and the ceiling plate 8, there is horizontally held an electrically conductive shaft 9 between both side plates 5 and 6 in a rotatable manner. A plurality of data indicating panels $10_1$ and $10_n$ are provided around the shaft. The fixing of the data indicating panels $10_1$ to $10_n$ is done by first securing each of circular discs 11 and 12 at both ends of the shaft 9, then fitting a plurality of thin shafts $13_1$ to $13_n$ in a circular form between the two discs near the periphery thereof at an equal space interval and with the shaft 9 as the center, and finally fixing one of the long side edges of the data indicating panels $10_1$ to $10_n$ to each of the shafts $13_1$ to $13_n$. Each of the data indicating panels $10_1$ to $10_n$ is formed, for example, into an envelope shape with a transparent plastic material as shown in FIG. 4, opposite the shaft fitting side of which a thin slit opening 15 is formed to permit insertion thereinto and withdrawal therefrom of a card 14, on which necessary data are to be recorded. It is, of course, possible that the data indicating panel may simply be in a planar shape.

As shown in FIG. 2, an oblong plate 17 is fixed at its both end parts to flanges $16_1$ and $16_2$ respectively provided on the rear side of the side plates 5 and 6, on which a small size electric motor 18 is secured. The motor 18 is driven by an operational mechanism to be described later, and transmits power generated by its rotation to a gear 25 fixed on the rotational shaft 9 of the above-described data indicating panels $10_1$ to $10_n$ through gear trains 20 to 24 rotatably supported on the side plate 5 at the left side of the device from a gear $19_1$ fixed at the tip end of an output shaft 19 of the motor. A battery chamber 26 is provided at the bottom part of the housing 1 below the abovementioned data indicating panels $10_1$ to $10_n$. Replacement of a battery 28 can be done by opening and closing a cover 27 at the bottom of the housing 1.

On the outside surface of the abovementioned right side plate 6, there is fitted a switch-board 29 for regulating rotational angle of the motor 18. The regulating switch, as shown in FIGS. 1 and 7, is constructed with a rotational shaft 9, a rotary contact piece 30 integral with the rotational shaft 9, and a plurality of fixed contact pieces $31_1$ to $31_n$ respectively corresponding to the data indicating panels $10_1$ to $10_n$. The fixed contact pieces are provided either by being embedded in the switch-board 29, or by being printed thereon. Each of these fixed contact pieces $31_1$ to $31_n$ is connected with each of the keys $32_1$ to $32_n$ arranged on the data retrieving keyboard 3 on the lower front part of the housing 1 through electrical switching means. Each of the keys $32_1$ to $32_n$ on the data retrieving keyboard 3 is of the same size and shape, and they are arranged in two upper and lower rows in mutually offset positions as shown in FIGS. 1, 3, and 6.

The construction for fitting such keys on the keyboard will now be explained in reference to a key $32_4$ as an example. The key $32_4$ has a cap 33 projecting outwardly of a port in a corresponding shape formed in the keyboard, and a shaft 34, on the top end of which the cap 33 is fitted. The shaft 34 is inserted and held in a guide passage 36 formed in a frame body 35, both ends of which are fixed to the two side plates 5 and 6 in a slidable manner. Between the upper surface of the frame 35 and the cap 33 of the key, there is provided a coil spring 37, by the extending force of which the key is protruded outward to cause a flange portion 38 at the lower end of the cap 33 to contact the inner surface of the keyboard 3. On the other hand, a plate 39 held in a freely slidable manner to the frame 35 contacts the bottom end surface of the guide passage 36 of the frame 35, through a hole $40_4$ (which is one of the through-holes 40 corresponding to the keys $32_1$ to $32_n$) of which the lower part of the shaft 34 of the key $32_4$ projects downwardly. The shaft 34 has an engaging pawl 41 formed on its one part. This engaging pawl 41, as shown in detail in FIG. 6, is engaged with the peripheral brim of the through-hole $40_4$ of the abovementioned sliding plate in a state of the key $32_4$ being pushed downward against force of the coil spring 37, therby self-sustaining the key $32_4$. In this state of the key $32_4$ being depressed, when the adjacent key $32_3$, for example, is pressed down, the sliding plate 39, as shown in FIGS. 5 and 6, is pressed by an inclined surface part at the lower part of the engaging pawl 41 of the key $32_3$ to slightly shift leftward against force of the coil spring $39_1$. At this time, the engaging pawl 41 of the key $32_4$ gets off the through-hole $40_4$, and returns to its original position by the action of the coil spring 37 with the key $32_3$ being maintained in an engaged state with the peripheral brim of the through-hole 40 at the engaging pawl 41 thereof. Each of the keys $32_l$ to $32_n$ has each of contact pieces $42_l$ to $42_n$ fixed at the bottom end of the shaft. These contact pieces $42_1$ to $42_n$, except for the contact piece $42_4$, for example, are all in contact with contact plates $43_1$ and $43_2$ fixed to the frame 35. In this case, the contact piece $42_4$ of the key $32_4$ is in contact with a single fixed contact plate 46 common to each of the contact pieces $42_1$ to $42_n$ supported by the supporting legs 44 and 45 at the lower part of the frame. The abovementioned contact pieces $42_1$ to $42_n$ are respectively connected, as shown in FIG. 7, to the corresponding fixed contact pieces $31_1$ to $31_n$ of the switch-board 29 for regulating the rotational angle of the motor through lead lines $47_1$ to $47_n$. Further, the pair of contact plates $43_1$ and $43_2$ corresponding to the respective contact pieces $42_1$ to $42_n$ is connected to the power source (the battery, in this case) 28 through the lead wires $48_1$ and $48_2$, and the other contact plate 46 is connected to the power source 28 through the lead wire 49 so as to construct a short circuit for the motor 18. One of the terminals of the motor 18 is connected to the positive (+) side of the power source 28 through the lead wire 50, while the other terminal thereof is connected to one end of the rotational shaft 9, as shown in FIG. 2, through the lead wire 51 and the contact piece 52.

The state as illustrated in FIG. 6 shows that when the key $32_4$ is depressed, the contact piece $42_4$ becomes in contact with the fixed contact plate 46, and the circuit connection among the power source 28, the motor 18, the rotational shaft 9, the rotary contact piece 30 of the switch-board 29 for regulating the rotational angle of the motor, and the fixed contact $31_4$ therefor is disconnected. In this situation, the afore-described contact pieces, except for the contact piece $42_4$, are all "on" state. However, since the circuit connection of the switch-board is disconnected, the motor 18 is in stopped condition.

One of the data indicating panels $10_1$ to $10_n$ (in the illustrated embodiment in FIG. 3, the data indicating panel $10_4$) hangs downward from its supporting shaft $13_4$ and the lower end thereof is in contact with the panel holding member $35_1$ of the frame 35, and the next succeeding data indicating panel (in the illustrated embodiment, the panel $10_5$) is stopped at its end opposite the supporting shaft thereof by a flexible stopper 53, and held in a substantially upright position. The data recording surfaces $54_4$ and $54_5$ of these data indicating panels $10_4$ and $10_5$ appear from the window 2, whereby the data recorded in the data recording surfaces $54_4$ and $54_5$, of the data indicating panels $10_4$, $10_5$ which correspond to the key $32_4$ can be read through the transparent cover 4 covering the read-out window 2.

Next, when the key $32_8$, for example, is depressed, the contact piece $42_8$ thereof contacts the fixed contact plate 46, and, at the same time, the key $32_4$ returns to its original position by the afore-described mechanism, and contacts with the fixed contact plate $43_1$. On account of this, the circuit for the motor 18 is closed through the connection of the rotary contact piece 30 of the switch-board 29 and the fixed contact piece $31_4$ thereof, whereby the data indicating panels $10_1$ to $10_n$ rotate in the anti-clockwise direction, and the rotary contact piece 30 of the switch-board 29 reaches the fixed contact $31_8$, whereupon the motor circuit is disconnected and the motor stops its rotation. At this time, the data indicating panels $10_8$ and $10_9$ stop at the position of the previous panels $10_4$ and $10_5$, as the result of which the data surfaces $54_8$ and $54_9$ of these data indicating panels appear in the read-out window 2, and, at the same time, through the fixed contact plate 46, the motor circuit is shorted, so that when the power source is cut, the reverse electromotive force of the motor 18 due to its inertia rotation produces a braking force whereby the motor 18 abruptly stops. The braking means for the motor, however, is not limited to this system, but the other electromagnetic means will attain the purpose.

Since the present invention has been constructed as described in the foregoing, desired data can be accurately and rapidly retrieved by simply depressing the data selection keys. In addition, since no relay means and the like is used for the control electrical circuit, the device as a whole can be made in a simple construction and at a low manufacturing cost. Further, as the device can be constructed in a miniaturized size, it is most suited as the data retrieving device for use in a limited space such as on the desk top for finding out names, addresses, telephone numbers, and so forth. It is to be added that the afore-described data indicating panels can be made interchangeable with a rotary drum, on the peripheral surface of which a number of data are recorded, or a film strip in an endless web form.

Although, in the foregoing, the present invention has been described with reference to a preferred embodiment thereof, it should be understood that such embodiment is merely illustrative and not restrictive, and that any change and modification may be made by those persons skilled in the art within the spirit and scope of the invention as set forth in the appended claims.

What is claimed is:

1. In a data retrieving device having
    a casing;
    a rotational shaft horizontally supported between two side plates of said casing;
    a pair of circular disks fitted on said rotational shaft;
    a plurality of data indicating panels, each being supported hangingly around the periphery of said circular disks;
    an electric motor to transmit rotational force generated by its rotation to said rotational shaft;
    a plurality of data retrieving keys corresponding in number to said data indicating panels, said keys being arranged regularly on a key board; and
    a short circuit means for said motor, the improvement comprising,
    a. a contact piece provided at the side of one of said side plates to connect one end of said rotational shaft to a power source through said motor;
    b. a switch-board for regulating the rotational angle of said motor, said switch-board being fixed on the other side plate opposite to said side plate where said contact piece is located, and having a rotary contact piece fitted at the other end of said rotational shaft and a plurality of fixed contact pieces arranged radially on a rotational locus of said rotary contact piece;
    c. a plurality of normally closed type contact pieces for short-circuiting said motor circuit provided on one end of said keys, one end of each of said closed contact pieces being connected to each corresponding fixed contact piece on said switch-board, and the other end of said each contact piece being connected said power source; and
    d. a gear train provided on said side plate at the opposite side of said switch-board, said gear train transmitting rotational force of said motor to a gear fitted on said rotational shaft,
    said rotational shaft being made of electrically conductive material, and forming a part of the electric circuit for said motor; and
    each of said plurality of data retrieving keys having an engaging pawl thereon which is mechanically engaged with an engaging member when said key is pushed downward.

2. The data retrieving device as set forth in claim 1, wherein each of said keys comprises a shaft having a cap provided at one end thereof projecting outwardly of said key board, and said engaging pawl at the other end thereof opposite to said cap; a frame for slidably supporting said keys; spring means provided between the upper surface of said supporting frame and said cap of said key; a sliding plate held on said frame in a freely slidable manner, said plate being biased by spring force and having a plurality of holes, through which the lower part of each of said keys projects downwardly to engage said pawl of each key with the peripheral brim of said hole, when said key is pushed downward against force of said spring means, thereby self-sustaining said key.

3. The data retrieving device as set forth in claim 1, wherein said data indicating panel is formed of a transparent plastic material in an envelope shape.

* * * * *